US012614480B2

(12) United States Patent
Veitl et al.

(10) Patent No.: US 12,614,480 B2
(45) Date of Patent: Apr. 28, 2026

(54) METHOD AND DISPLAY SYSTEM FOR OPERATING A PROJECTION DISPLAY SYSTEM IN A MOBILE DEVICE

(71) Applicant: Bayerische Motoren Werke Aktiengesellschaft, Munich (DE)

(72) Inventors: Oliver Veitl, Hohenthann (DE); Wolfgang Witek, Ilmmuenster (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/066,286

(22) Filed: Feb. 28, 2025

(65) Prior Publication Data

US 2025/0308415 A1 Oct. 2, 2025

(30) Foreign Application Priority Data

Mar. 28, 2024 (DE) ...................... 10 2024 109 100.2

(51) Int. Cl.
*G09G 3/00* (2006.01)
*B60K 35/235* (2024.01)
(Continued)

(52) U.S. Cl.
CPC ........... *G09G 3/001* (2013.01); *B60K 35/235* (2024.01); *G06F 3/013* (2013.01);
(Continued)

(58) Field of Classification Search
CPC .... H10K 59/121; H10K 59/353; H10K 59/60; H10K 2102/102; H10K 2102/103;
(Continued)

(56) References Cited

U.S. PATENT DOCUMENTS 11,436,698 B2 9/2022 Ha
2017/0169612 A1* 6/2017 Cashen ................... G06T 19/20
(Continued)

FOREIGN PATENT DOCUMENTS

DE 10 2010 032 998 A1 2/2012
DE 10 2018 201 631 A1 8/2019
DE 10 2012 204 303 B4 7/2022

OTHER PUBLICATIONS

German-language Search Report issued in German Application No. 10 2024 109 100.2 dated Dec. 20, 2024 with partial English translation (12 pages).

*Primary Examiner* — Pegeman Karimi
(74) *Attorney, Agent, or Firm* — Crowell & Moring LLP

(57) ABSTRACT

A display system for a motor vehicle includes a projection device having a display device which is configured to output image-bearing light for projecting a display image in an eye area of a user via a display surface. A combiner surface reflects the image-bearing light into the eye area of the user. A device configured to obtain an eye pose of the user transforms a display image with the aid of a post-transformation matrix so that local flaws in a surface section of the combiner surface which result in a distortion or a fuzziness of a perception image perceptible by the user are compensated. A display image is displayed on the display surface using brightness values so that a homogeneous and high contrast representation results based on the eye pose of the user and the detail of the combiner surface. The transformed display image is output via the display device.

13 Claims, 3 Drawing Sheets

(51) Int. Cl.
_G06F 3/01_ (2006.01)
_G02B 27/01_ (2006.01)

(52) U.S. Cl.
CPC .... _B60K 2360/21_ (2024.01); _B60K 2360/349_
(2024.01); _G02B 27/0101_ (2013.01); _G02B_
_27/0179_ (2013.01); _G02B 2027/0187_
(2013.01); _G09G 2320/0626_ (2013.01); _G09G_
_2360/144_ (2013.01); _G09G 2380/10_ (2013.01)

(58) Field of Classification Search
CPC ... G09G 2300/0426; G09G 2300/0452; G09G
3/3225; G09F 9/35; G09F 9/33
See application file for complete search history.

(56) References Cited

U.S. PATENT DOCUMENTS

2017/0193687 A1* 7/2017 Lo ............................. G06T 3/18
2021/0233207 A1* 7/2021 Ha ....................... H04N 13/344

* cited by examiner

METHOD AND DISPLAY SYSTEM FOR OPERATING A PROJECTION DISPLAY SYSTEM IN A MOBILE DEVICE

CROSS REFERENCE TO RELATED APPLICATION

This application claims priority under 35 U.S.C. § 119 from German Patent Application No. 10 2024 109 100.2, filed Mar. 28, 2024, the entire disclosure of which is herein expressly incorporated by reference.

BACKGROUND AND SUMMARY

The invention relates to projection display systems, in particular head-up displays, and in particular measures for distortion-free and brightness-adapted display of a projection display image.

Windshield display devices, such as head-up display devices, for visually displaying information in the field of view of a user of a motor vehicle, are known from the prior art. For example, document DE 10 2010 032 998 A1 describes a head-up display for a motor vehicle having a projection display device, via which a display image to be displayed by a display device is projected on a windshield of a motor vehicle acting as a combiner surface. Such windshield display devices have the advantage in contrast to the other display devices in the motor vehicle that the user does not have to look away from the traffic events to acquire important information, such as the current vehicle speed or visual instructions of a navigation system.

In motor vehicles, the combiner surface often corresponds to a surface area of the windshield. The windshield is generally not planar and has a curvature, so that the surface area of the combiner surface of the windshield has reflection properties which deviate from those of a planar mirror. A display image to be projected is therefore displayed distorted due to the curved mirror surface of the surface area. Due to the curvature, the type of the distortion is significantly dependent on the eye position in relation to the combiner surface. The influence of the curvature of the combiner surface in the surface area of the windshield is currently compensated for by prior transformation of display images of the display device, which is adapted to the respective curvature geometry of the surface area of the windshield.

In addition, the surface area of the combiner surface of the windshield which is used for the reflection of the projection display system is subject to diverse imperfections due to material properties and the manufacturing, so that local deviations from the desired curvature geometry exist. These local flaws are currently not corrected and it is presumed that they are not perceptible to humans within the display image.

Rising quality requirements in the form of high-resolution display images and greater distances between the mirror plane of the combiner surface and the image plane of the projector have caused the requirements for the quality of the surface area of the combiner surface of the windshield used for the reflection to rise. The correspondingly required additional expenditure in the production of a lower-flaw windshield is high and it is therefore the object of the present invention to provide an improved possibility for providing projection display systems for displaying high-resolution and flaw-free display images, which have lower requirements for the quality of the combiner surface.

This object is achieved by the display system for a mobile device and by the method for operating a projection display system according to the independent claims.

Further embodiments are specified in the dependent claims.

According to a first aspect, a display system for a mobile device, in particular a vehicle, another utility vehicle, a ship, an aircraft, and the like is provided, comprising:

a projection device having a display device which is designed to output image-bearing light for projecting a display image in an eye area of a user via a display surface, a combiner surface for reflecting the image-bearing light into the eye area of the user;

a device (for example, as part of a vehicle assistance system), which is designed to obtain an eye pose of the user, to transform (post-transform) a display image to be displayed before the display on the display surface with the aid of a post-transformation matrix so that local flaws in a surface section of the combiner surface which result in a distortion or a fuzziness of a perception image perceptible by the user are compensated for, wherein the surface section depends on the eye pose of the user and corresponds to the detail of the combiner surface via which the display image is perceived by the user; and to manipulate a display image to be displayed before the display on the display surface using brightness values so that a homogeneous and high contrast representation results on the basis of the eye pose of the user and the detail of the combiner surface; and to output the post-transformed display image via the display device.

The manufacturing variations in the production of bent or curved flat glass panes as the windshield of a mobile device are too large for the display of a display image in a projection display system for the display of high-resolution display images, and the display images are therefore perceived as fuzzy or distorted.

The device can be designed to pre-transform the display image so that a pre-transformed display image is provided which compensates for a global curvature geometry of the combiner surface. The compensation is carried out by considering the location, the inclination, and the global curvature of the windshield.

The planar (global) bend or curvature of the combiner surface is thus corrected by a predetermined pre-transformation, i.e. the display image is output distorted as a pre-transformed display image by the display device, such as projectors, video projectors, LED, LCD, or μLED display devices, and projected via the combiner surface of the windshield into the eyes of the user, so that as a result a perception image (the image perceived by the user) which is not distorted by the curvature of the windshield is perceived.

Furthermore, the device can be designed to post-transform the display image to be displayed or the pre-transformed display image so that a post-transformed display image is provided, which compensates for local flaws that correspond to deviations from the global curvature geometry.

Due to local flaws or limited deviations from the global curvature geometry of the combiner surface, without correction a distortion of the display image takes place which results in fuzzy or distorted perceptions of a part of or of the entire perception image. While the curvature geometry of the combiner surface can be compensated for by a corresponding pre-transformation of the display image to be displayed before the display on the display surface of the display device, local deviations from the predetermined target geometry of the combiner surface significantly impair the representation of individual limited image areas of the perception image. While the global curvature geometry can be applied to the entire display image, the observed image area of the perception image which is distorted by a local flaw depends more strongly on the exact eye position of the user. In this area, local deviations of the geometric and optical properties of the combiner surface from the curvature geometry impair the quality of the representation of different pixels or image areas depending on the eye position.

It is therefore provided according to the above method that the eye pose, i.e., the location or the position and the orientation of the eyes, be used for a compensation of local flaws. For this purpose, an overall transformation matrix going beyond the curvature geometry of the combiner surface is provided, which specifies the additional optical influence of local flaws over the course of the entire combiner surface. The overall transformation matrix can have a size which corresponds to or goes beyond the pixel resolution of the display device. Therefore, for example, the combiner surface can be divided into pixel areas, each of which corresponds to a surface point at which a pixel of the display surface of the display device is reflected.

By providing the eye pose in a vehicle-fixed coordinate system and if the arrangement or position of the display surface for the display image and the combiner surface are known, including their geometric and optical properties in relation to the vehicle coordinate system, the surface section in the combiner surface can be determined, via which the display surface of the display device is perceived in the eye of the user. A corresponding post-transformation matrix can be used for this surface section, which is designed and provided for correcting the display image with respect to local flaws. The post-transformation matrix can be taken as a subset or detail from the provided overall transformation matrix which is provided for the entire combiner surface and describes the effect of the local optical influences on the light reflection.

With the aid of a correction algorithm, which applies the post-transformation matrix to the display image pre-transformed with respect to the global curvature geometry (see last section), a post-transformed display image can now be provided which takes into consideration and compensates for the local distortions and deviations from the predetermined curvature geometry of the combiner surface within the surface section. The consideration of the local distortions and deviations from the predetermined curvature geometry can take place pixel area by pixel area or pixel by pixel of the surface section of the combiner surface, wherein the resolution is determined by the surface area of a local area of the combiner surface, via which a pixel of the display device is perceived in the eyes of the user. The surface section is selected as a portion of the combiner surface having its geometric properties by the eye pose estimation. The post-transformation matrix then enables a visually perfect representation to be perceived via the combiner surface for the surface section.

The post-transformation matrix, which describes or takes into consideration the distortion of the pixel areas of the combiner surface with respect to their optical reflection properties in a two-dimensional manner, has a size such that the display image can be post-transformed so that due to the local flaw of the combiner surface which influences the reflection of the pixel, a pixel is displayed with a fuzziness or distortion on the retina of the eyes of the user which is below the perception threshold.

A pose determination system can be provided as part of a vehicle assistance system in order to provide the eye pose, wherein a camera image is captured with the aid of an interior camera, in order to evaluate it using an object recognition method to estimate the eye pose of a user.

The pose of the eyes of the user can be determined using a tracking method, for example, with the aid of an interior camera and a tracking algorithm. For this purpose, an image is recorded using the interior camera which can capture the head of the user. In conjunction with the known position and orientation of the interior camera in the vehicle coordinate system, a suitable pose estimation of the head or the eyes of the user can be carried out. Such object recognition algorithms are known from the prior art and are already used for pose determination of the head or the eyes of a user in mobile devices.

In addition, it can be provided that the brightness values of the pixels of the transformed or the post-transformed display image are corrected pixel by pixel depending on a respective brightness value of pixels of a surroundings image detail, wherein the surroundings image detail corresponds to a detail from a surroundings image captured by a surroundings camera which is perceived by the user through the surface section of the combiner surface.

A surroundings image is recorded with the aid of the surroundings camera. In conjunction with the eye pose estimation, the observed detail of the surroundings can be selected from the recording of the surroundings camera.

The determination of the surroundings image detail and the pose estimation permit an assignment of the display points to the respective surroundings points, which are observed through the combiner surface, to the respective surface points of the surface section of the combiner surface. Each of these three elements assigned to one another, surroundings, display, and surface, have an influence on the perceived brightness (pixels). By implication, this means a change of these values is necessary.

A surroundings image of the vehicle surroundings can thus be captured with the aid of the surroundings camera. A surroundings image detail, which the user perceives through the surface section of the combiner surface, can be selected from the surroundings image with the aid of the eye pose estimation. The relevant surroundings image detail can be determined by optical modeling methods, using which a projection of the surface section on the vehicle surroundings is carried out with respect to the current eye positions. In particular, the pixel area on the combiner surface can be determined by the optical modeling method for each pixel of the display image and it can be determined which pixel of the surroundings image detail is overlaid by the pixel of the display surface.

Each of the pixels of the display image can now be assigned a brightness value, which is set depending on the brightness of the pixel of the surroundings image detail, which is perceived by the eye of the user via the corresponding pixel area of the surface section of the combiner surface. In this way, the homogeneity of the brightness distribution and the contrast can be improved over the entire perceived image, which are influenced by the reflection properties of the combiner surface. The local variations and global changes in the brightness profile, which are known from the predetermined optical properties of the combiner surface and the captured surroundings, can therefore be corrected uniformly. The global contrast for better visibility of the image can be selected by the known surroundings value for the observed point. The contrast of the perception image can be improved in that pixels of the display image which are located in front of particularly bright areas of the vehicle surroundings depending on the pose of the eyes are displayed brighter and pixels in front of darker areas of the vehicle surroundings are accordingly displayed darker.

The displayed display image can thus have, in addition to a pre-transformation to compensate for the global curvature geometry of the combiner surface and a further post-transformation based on local flaws of the combiner surface, a corresponding contrast compensation be performed, to generate the display image for display by the display device of the projection unit.

The method is carried out continuously and the pose of the eyes of the user is tracked continuously, i.e., in real time.

Embodiments are explained in more detail hereinafter based on the appended drawings. In the figures:

DETAILED DESCRIPTION OF THE DRAWINGS

Figure 1:
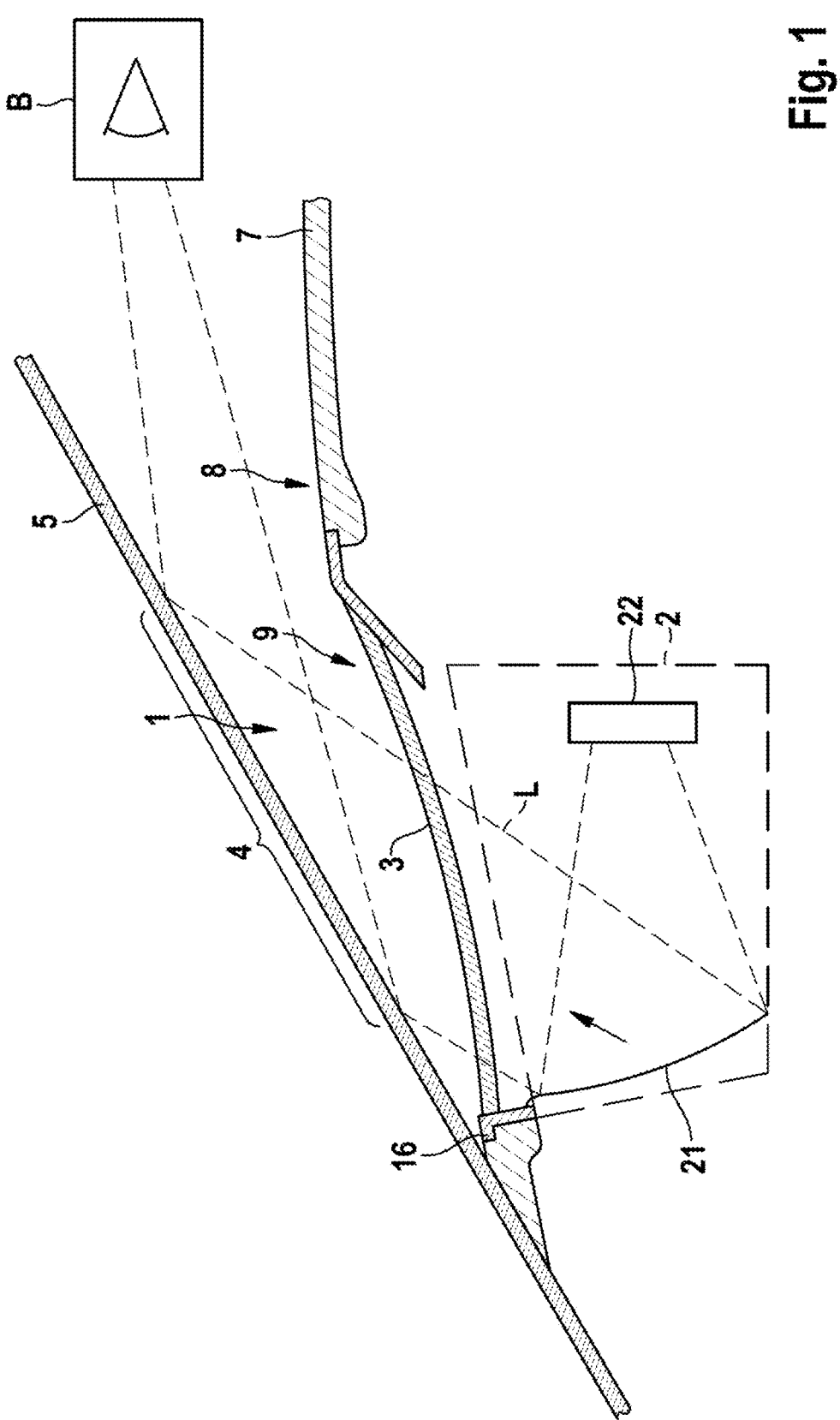
FIG. 1 shows a schematic representation of a projection display system in a motor vehicle.

FIG. 1 schematically shows a cross-sectional representation through a projection display device 1, such as a head-up display. The projection display device 1 comprises an optical projection device 2 and a cover having a cover plate 3.

The projection display device 1 is essentially inserted into an opening 9 in an upper side 8 of an instrument panel 7 between a steering wheel and a windshield 5 so that it terminates essentially with the upper side 8 or adjoins thereon.

The projection device 2 emits a projection beam bundle L in a suitable manner, which is directed in a projection direction onto a combiner surface 4 of a windshield 5 of a motor vehicle. The projection device 2 comprises, in a known manner, a system made up of one or more mirrors 21, including a concave mirror and possibly lenses (not shown) and a display device 22.

The display device 22 can preferably be designed as a self-illuminating LCD, MicroLED, OLED, and the like to output a display image.

A display image output by the display device 22 is oriented as an image-bearing projection beam bundle L by the one or the multiple mirrors 21 in the projection direction P and directed onto the combiner surface 4. The image-bearing projection beam bundle L directed onto the combiner surface 4 is reflected at the combiner area 4 and directed onto an eye area B of a user, so that a perception image results in the eye or the eyes of the user that corresponds to a desired display image and by which information can be displayed.

A cover plate 3 can be provided directly at the projection device 2 which protects the projection device 2 from soiling by dust particles, for example, and ensures a glare protection.

Figure 2:
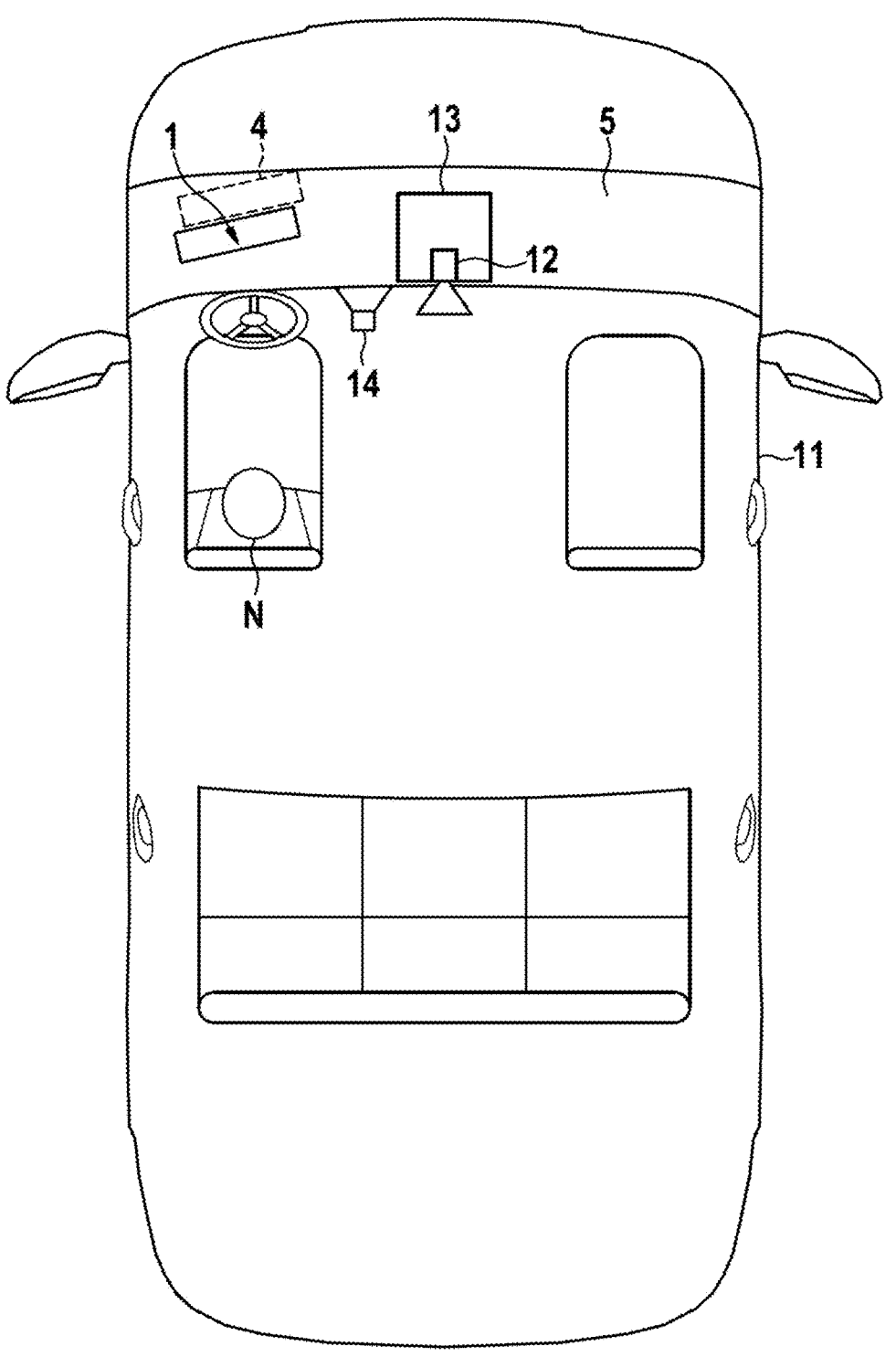
FIG. 2 shows a schematic top view of an interior of a motor vehicle.

FIG. 2 shows a schematic top view of an interior of a motor vehicle 11.

A vehicle assistance system 13 is provided, which provides a display image to be output to the display device 22. The vehicle assistance system 13 comprises a data processing device, which carries out a method for operating the display system.

Furthermore, an interior camera 12 is provided, which is connected to a vehicle assistance system 13.

The interior camera 12 captures an image of the user, in particular the head area, in order to determine an eye pose of the eyes of the user, i.e., the position and orientation of the eyes, based on object recognition methods known per se, which are implemented as an algorithm in the vehicle assistance system 13.

Due to the known camera pose of the interior camera 12 in the vehicle coordinate system, a vehicle-fixed pose of the eyes of the user can be determined in a way known per se with the aid of the object recognition method.

Furthermore, a surroundings camera 14 can be provided, which captures a surroundings image detail of vehicle surroundings lying ahead from the vehicle interior, and provides this detail to the vehicle assistance system 13. The surroundings image detail comprises the detail of the vehicle surroundings which can be visually perceived through the combiner surface by the user.

Figure 3:
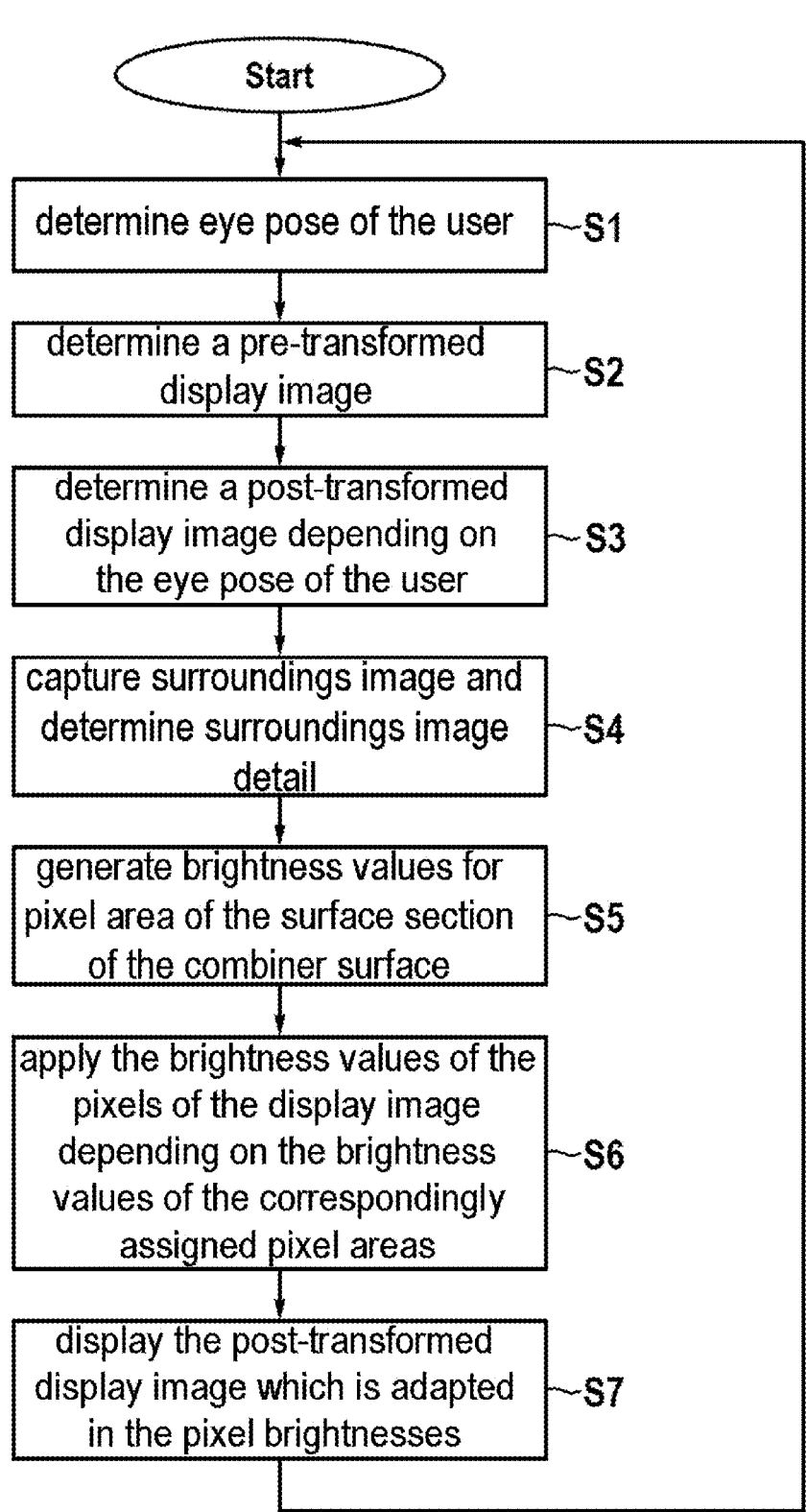
FIG. 3 shows a flow chart to illustrate a method for operating the projection display system of FIG. 1.

A flow chart to illustrate a method for adapting a display image in the projection unit is described in FIG. 3, which enables local flaws of the surface of the combiner surface, which represent deviations from the global planar curvature geometry of the windshield, due to manufacturing tolerances, to be compensated for and moreover a contrast adaptation to be performed. The method is implemented in the vehicle assistance system as software and/or hardware.

In step S1, initially an eye pose of the eyes of the user is recognized. For this purpose, a camera image of the user can be captured with the aid of the interior camera 12 and analyzed in a way known per se with the aid of an object recognition method, so that the position and orientation of the eyes of the user are determined with respect to the camera position and camera orientation (camera pose). Based on the camera pose of the interior camera and the position of the eyes of the user with respect to the position of the interior camera known with the aid of the object recognition algorithm, the positions of the eyes of the user can be determined with respect to the vehicle coordinate system in a way known per se.

In the display device 22 of the projection display system 1, a display image to be displayed is provided and this is transformed in step S2 according to a pre-transformation matrix in order to compensate for the global curvature geometry of the windshield 5 so that the display image which is projected by the display device via the combiner surface into the eyes of the user can be perceived by this user undistorted with respect to the curvature of the windshield 5. The pre-transformation takes into consideration the curvature geometry of the windshield 5 in accordance with the target geometry.

Furthermore, in step S3, the display image thus pre-transformed is post-transformed according to a post-transformation matrix to compensate for the distortions of the display image due to the local flaws in the area of the combiner surface via which the display image is reflected into the eye of the user. The post-transformation matrix is generated by a selection of a part of a predetermined overall transformation matrix which depends on the pose of the eyes of the user. The overall transformation matrix describes a transformation function to compensate for the influence of the local flaws over the entire surface area of the available combiner surface. The post-transformation matrix describes a transformation function to compensate for the influence of the local flaws in a surface section of the combiner surface in which the display image is reflected into the eye of the user. This surface section depends on the eye pose of the user and corresponds to that area of the combiner surface via which the display image of the display device can be perceived by the user.

The two-dimensional post-transformation matrix has a size which can compensate for the local flaws within the combiner surface with a sufficient accuracy. By applying the post-transformation matrix to the pre-transformed display image, the distortions caused by the manufacturing tolerances and the local flaws on the combiner surface can now be compensated for so that a post-transformed display image is provided.

A surroundings image is captured in step S4 with the aid of the surroundings camera 14. Due to the previously determined eye pose, the observed surroundings image detail can be determined in the captured surroundings image (background modeling), which is perceived through the surface area. In other words, a region of interest (a surroundings image detail) is determined from the surroundings image which is perceived by the surface area of the combiner surface in the eye of the user.

For the individual pixels of the surroundings image detail, in step S5, the brightness values can be generated, wherein therefore a background brightness, which specifies the brightness at the corresponding pixel area, can be assigned to each pixel area of the surface section of the combiner surface, which depends on the eye pose. Each of the pixels of the display image which is perceived by the user through a pixel area of the surface section of the combiner surface can therefore be assigned a pixel of the surroundings image detail and its brightness. Each of the pixels of the display image therefore represents a location in the real surroundings which the user can perceive through the combiner surface. The corresponding pixel area of the surface section therefore forms, with the eye pose of the user, an optical visual axis, which intersects the surface section of the combiner surface.

Via the brightness of the corresponding pixels of the surroundings image detail, a brightness value is available, with which the user perceives the corresponding local area through the combiner surface. The pixels of the post-transformed display image respectively assigned to the pixel areas can now optionally be corrected using this brightness value in step S6, so that the pixels of the display image are accordingly displayed brighter if the corresponding pixel of the surroundings image detail is brighter, and vice versa are displayed darker if the corresponding pixel of the surroundings image detail is darker.

In step S7, the post-transformed display image, which is possibly adapted in the individual pixel brightnesses, can be output via the display device 22.

After the display of the display image thus post-transformed, the method can be carried out again by jumping back to step S1.

In this way, an algorithm can be provided which compensates for the flaws and manufacturing tolerances of the combiner surface of a geometric and optical nature in real time and moreover offers the option of contrast improvement.

LIST OF REFERENCE SIGNS 1 projection display system
2 projection device
21 mirror
22 display device
3 cover plate
4 combiner surface 5 windshield
7 instrument panel
8 upper side
9 opening
L projection beam bundle
B eye area
11 motor vehicle
12 interior camera
13 vehicle assistance system
14 surroundings camera

What is claimed is:

1. A display system for a motor vehicle, the display system comprising:
   a projection device including a display device, which is configured to output image-bearing light for projecting a display image into an eye area of a user via a display surface;
   a combiner surface configured to reflect the image-bearing light into the eye area of the user; and
   a data processing device configured to
   obtain an eye pose of the user,
   transform the display image to be displayed before the display on the display surface based on a post-transformation matrix so that local flaws in a surface section of the combiner surface which result in a distortion or a fuzziness of a perception image perceptible by the user are compensated for, wherein the surface section depends on the eye pose of the user and corresponds to detail from the combiner surface, via which the display image is perceived by the user, and
   output a post-transformed display image via the display device;
   wherein the data processing device is configured to pre-transform the display image so that a pre-transformed display image is provided which compensates for a global curvature geometry of the combiner surface.

2. The display system according to claim 1, wherein the data processing device is configured to post-transform the display image to be displayed or the pre-transformed display image so that the post-transformed display image is provided which compensates for local flaws that correspond to deviations from the global curvature geometry.

3. The display system according to claim 1, wherein the data processing device is configured to correct brightness values of pixels of the pre-transformed display image or the post-transformed display image pixel-by-pixel depending on a respective brightness value of pixels of a surroundings image detail.

4. The display system according to claim 3, wherein the surroundings image detail corresponds to a detail from a surroundings image captured by a surroundings camera, which is perceived by the user through a surface area of the combiner surface.

5. The display system according to claim 1, wherein a pose determination system is provided to obtain the eye pose, or wherein an interior camera is provided to evaluate a captured camera image based on an object recognition method to obtain the eye pose of the user.

6. A motor vehicle having a display system according to claim 1, wherein the combiner surface is part of a windshield of the motor vehicle.

7. A display system for a motor vehicle, the display system comprising:
   a projection device including a display device, which is configured to output image-bearing light for projecting a display image into an eye area of a user via a display surface;

a combiner surface configured to reflect the image-bearing light into the eye area of the user; and a data processing device configured to obtain an eye pose of the user, transform the display image to be displayed before the display on the display surface based on a post-transformation matrix so that local flaws in a surface section of the combiner surface which result in a distortion or a fuzziness of a perception image perceptible by the user are compensated for, wherein the surface section depends on the eye pose of the user and corresponds to detail from the combiner surface, via which the display image is perceived by the user, and output a post-transformed display image via the display device;

wherein the data processing device is configured to post-transform the display image to be displayed so that the post-transformed display image is provided which compensates for local flaws that correspond to deviations from a global curvature geometry.

8. The display system according to claim 7, wherein the data processing device is configured to correct brightness values of pixels of the post-transformed display image pixel-by-pixel depending on a respective brightness value of pixels of a surroundings image detail.

9. The display system according to claim 8, wherein the surroundings image detail corresponds to a detail from a surroundings image captured by a surroundings camera, which is perceived by the user through a surface area of the combiner surface.

10. The display system according to claim 7, wherein a pose determination system is provided to obtain the eye pose, or wherein an interior camera is provided to evaluate a captured camera image based on an object recognition method to obtain the eye pose of the user.

11. A display system for a motor vehicle, the display system comprising:

a projection device including a display device, which is configured to output image-bearing light for projecting a display image into an eye area of a user via a display surface;

a combiner surface configured to reflect the image-bearing light into the eye area of the user; and a data processing device configured to obtain an eye pose of the user, transform the display image to be displayed before the display on the display surface based on a post-transformation matrix so that local flaws in a surface section of the combiner surface which result in a distortion or a fuzziness of a perception image perceptible by the user are compensated for, wherein the surface section depends on the eye pose of the user and corresponds to detail from the combiner surface, via which the display image is perceived by the user, and output a post-transformed display image via the display device;

wherein the data processing device is configured to correct brightness values of pixels of the post-transformed display image pixel-by-pixel depending on a respective brightness value of pixels of a surroundings image detail.

12. The display system according to claim 11, wherein the surroundings image detail corresponds to a detail from a surroundings image captured by a surroundings camera, which is perceived by the user through a surface area of the combiner surface.

13. A method for operating a display system for a motor vehicle, which includes a projection device having a display device, which is configured to output image-bearing light for projecting a display image into an eye area of a user via a display surface, and a combiner surface configured to reflect the image-bearing light into the eye area of the user, the method comprising:

determining an eye pose of the user;

transforming a display image to be displayed before the display on the display surface based on a post-transformation matrix, so that local flaws in a surface section of the combiner surface, which result in a distortion or a fuzziness of a perception image perceptible by the user, are compensated for, wherein the surface section depends on the eye pose of the user and corresponds to detail from the combiner surface, via which the display image is perceived by the user; and outputting a post-transformed display image via the display device;

wherein brightness values of pixels of the post-transformed display image are corrected pixel by pixel depending on a respective brightness value of pixels of a surroundings image detail, wherein the surroundings image detail corresponds to a detail from a surroundings image captured by a surroundings camera, which is perceived by the user through the surface area of the combiner surface.

* * * * *